Figure 8:
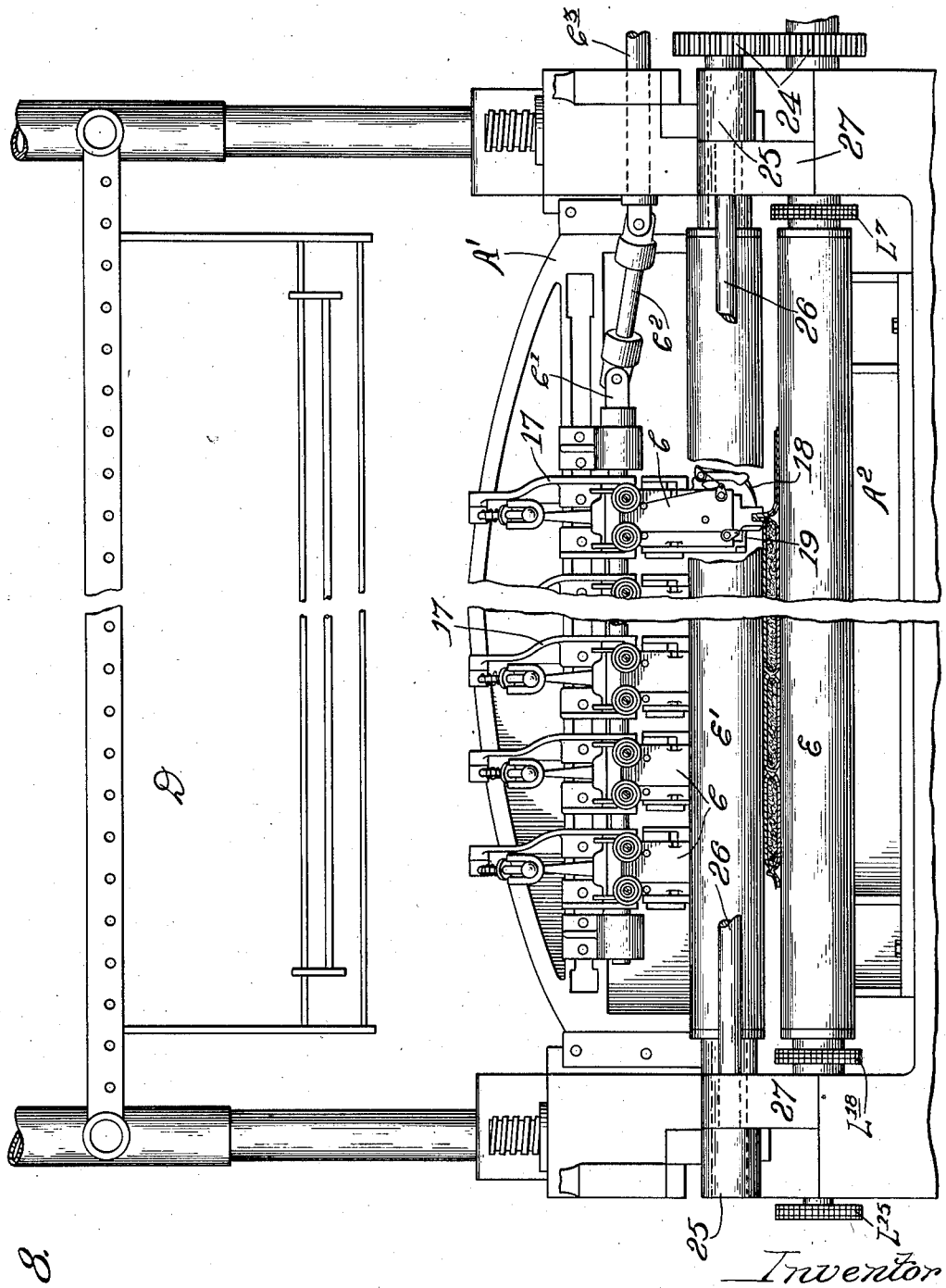

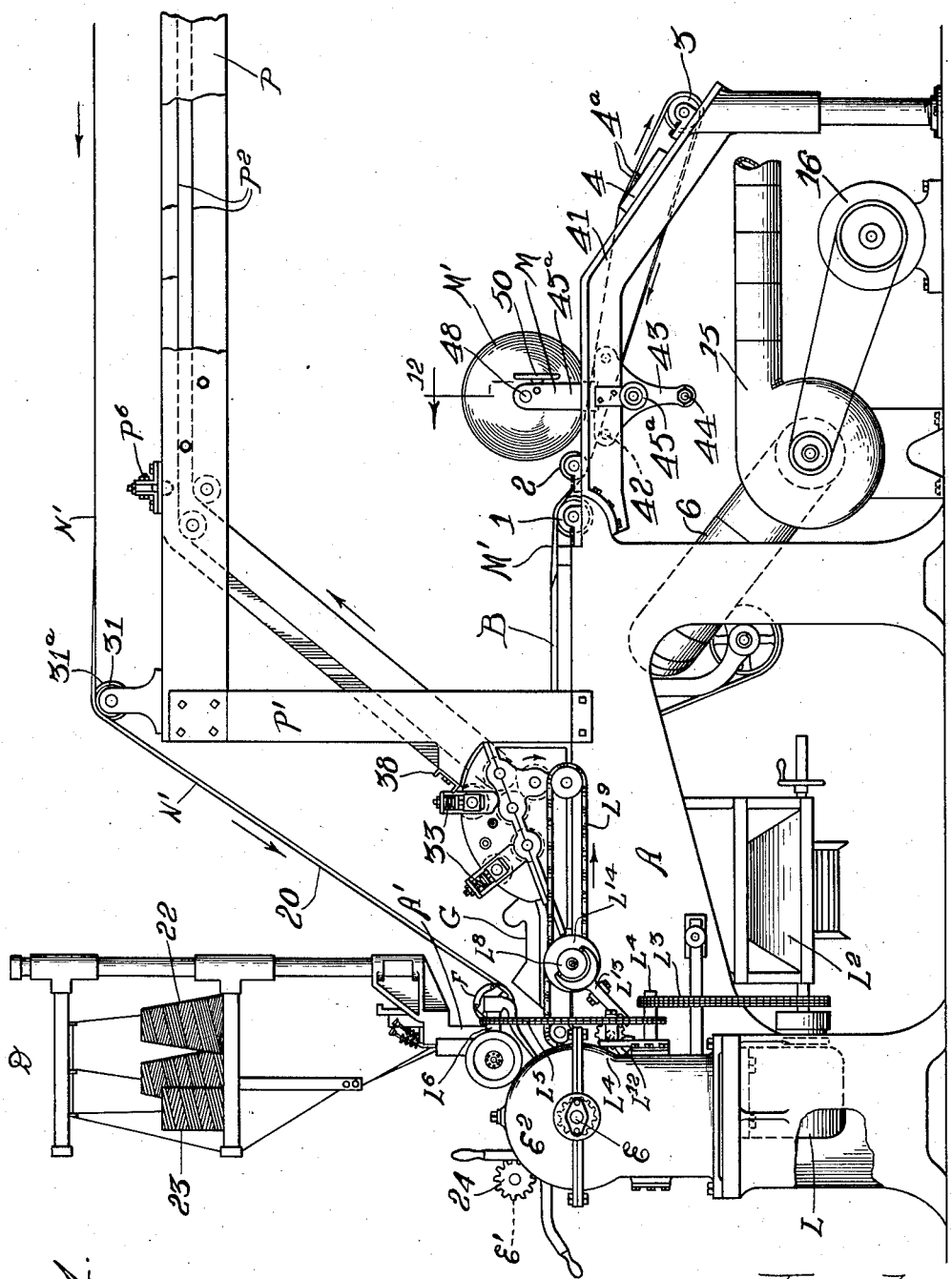

Aug. 21, 1934.  A. S. MITCHELL  1,971,115
UPHOLSTERY MAKING MACHINE AND PROCESS
Filed Feb. 10, 1930  8 Sheets-Sheet 2
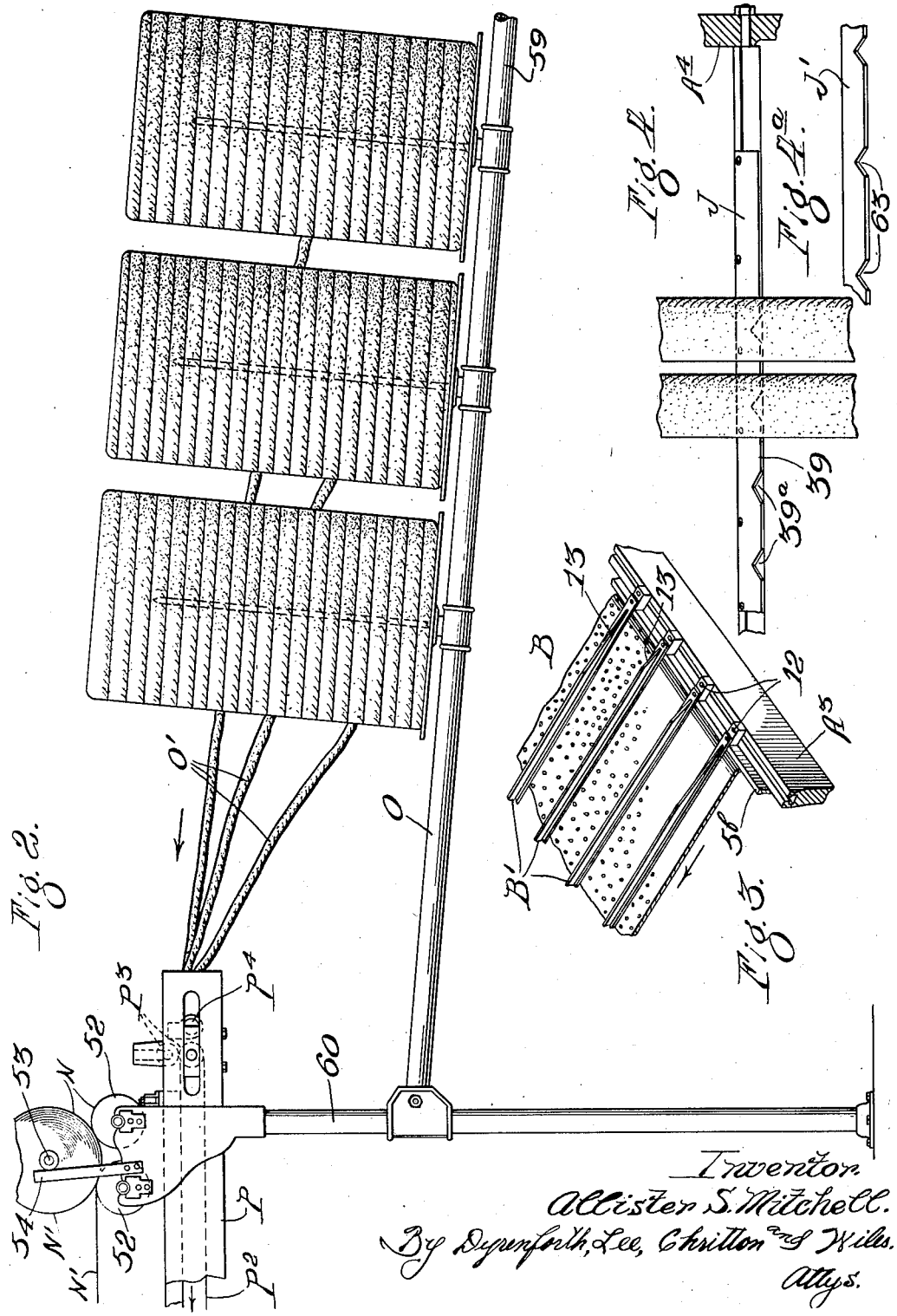

Aug. 21, 1934.  A. S. MITCHELL  1,971,115
UPHOLSTERY MAKING MACHINE AND PROCESS
Filed Feb. 10, 1930  8 Sheets-Sheet 3
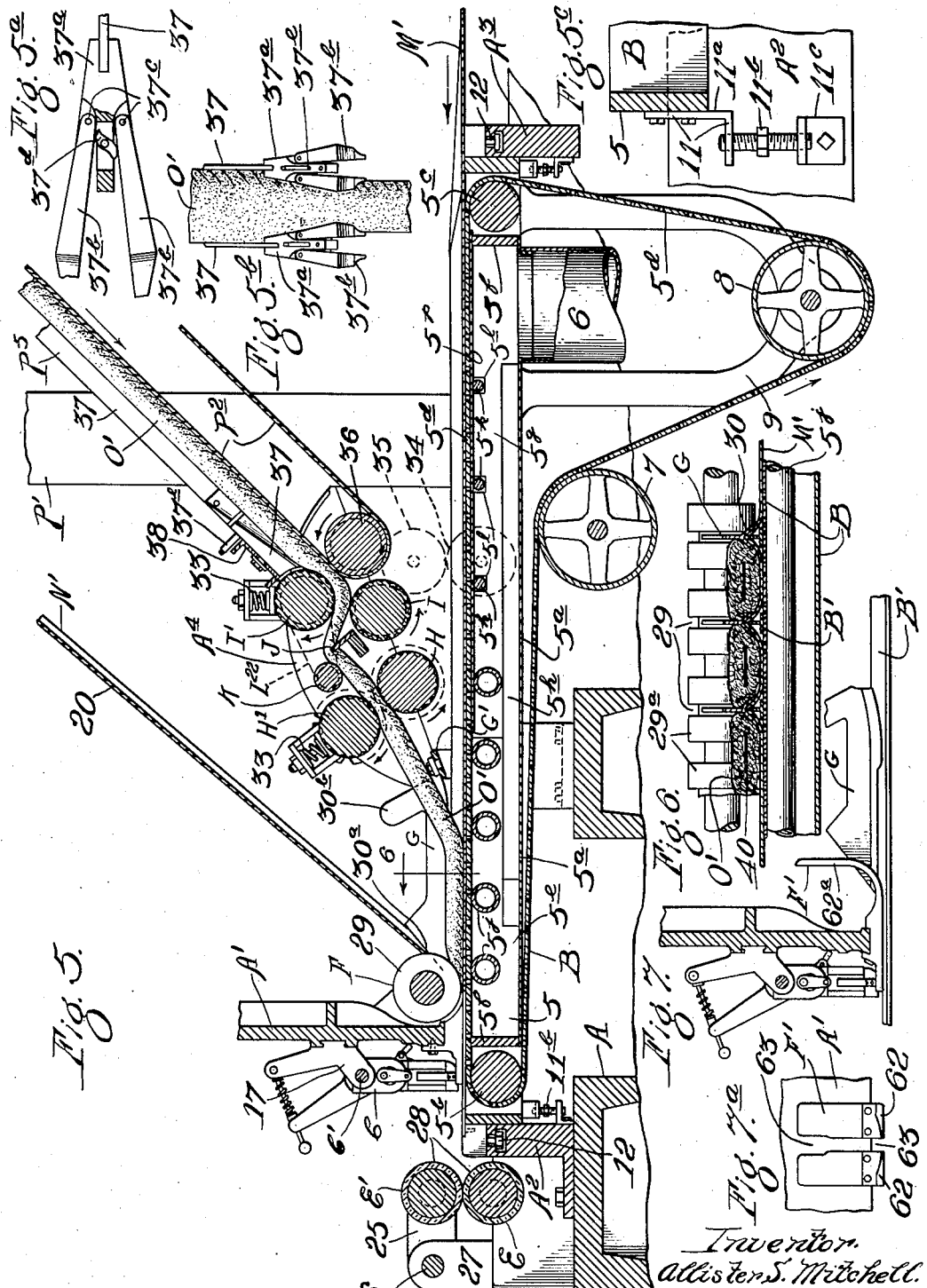
Inventor.
Allister S. Mitchell.
By Dyrenforth, Lee, Chritton and Wiles.
Attys.

Aug. 21, 1934.   A. S. MITCHELL   1,971,115
UPHOLSTERY MAKING MACHINE AND PROCESS
Filed Feb. 10, 1930   8 Sheets-Sheet 4

Inventor
Allister S. Mitchell.
By Dyrenforth, Lee, Chritton and Wiles
Attys.

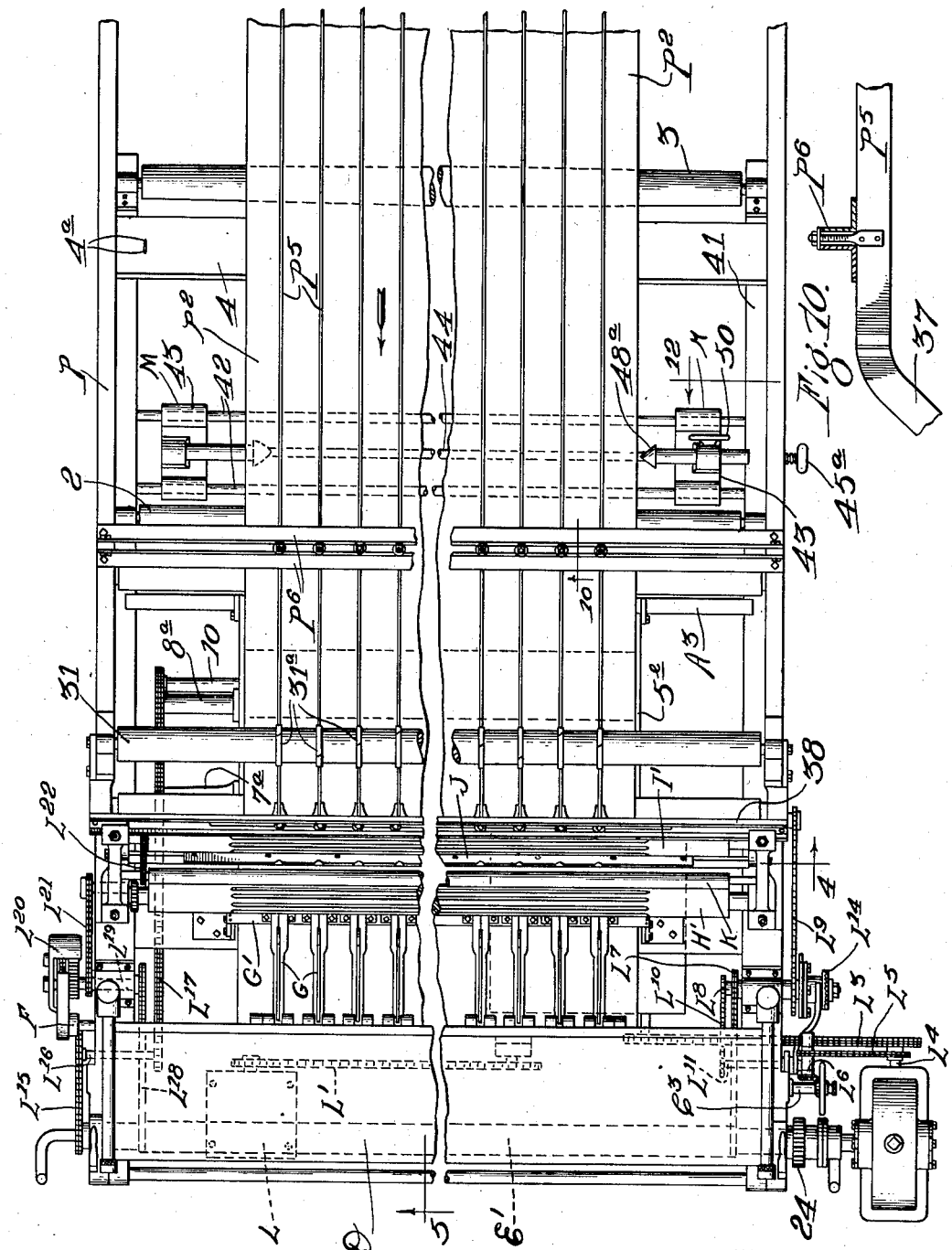

Aug. 21, 1934. A. S. MITCHELL 1,971,115
UPHOLSTERY MAKING MACHINE AND PROCESS
Filed Feb. 10, 1930 8 Sheets-Sheet 6
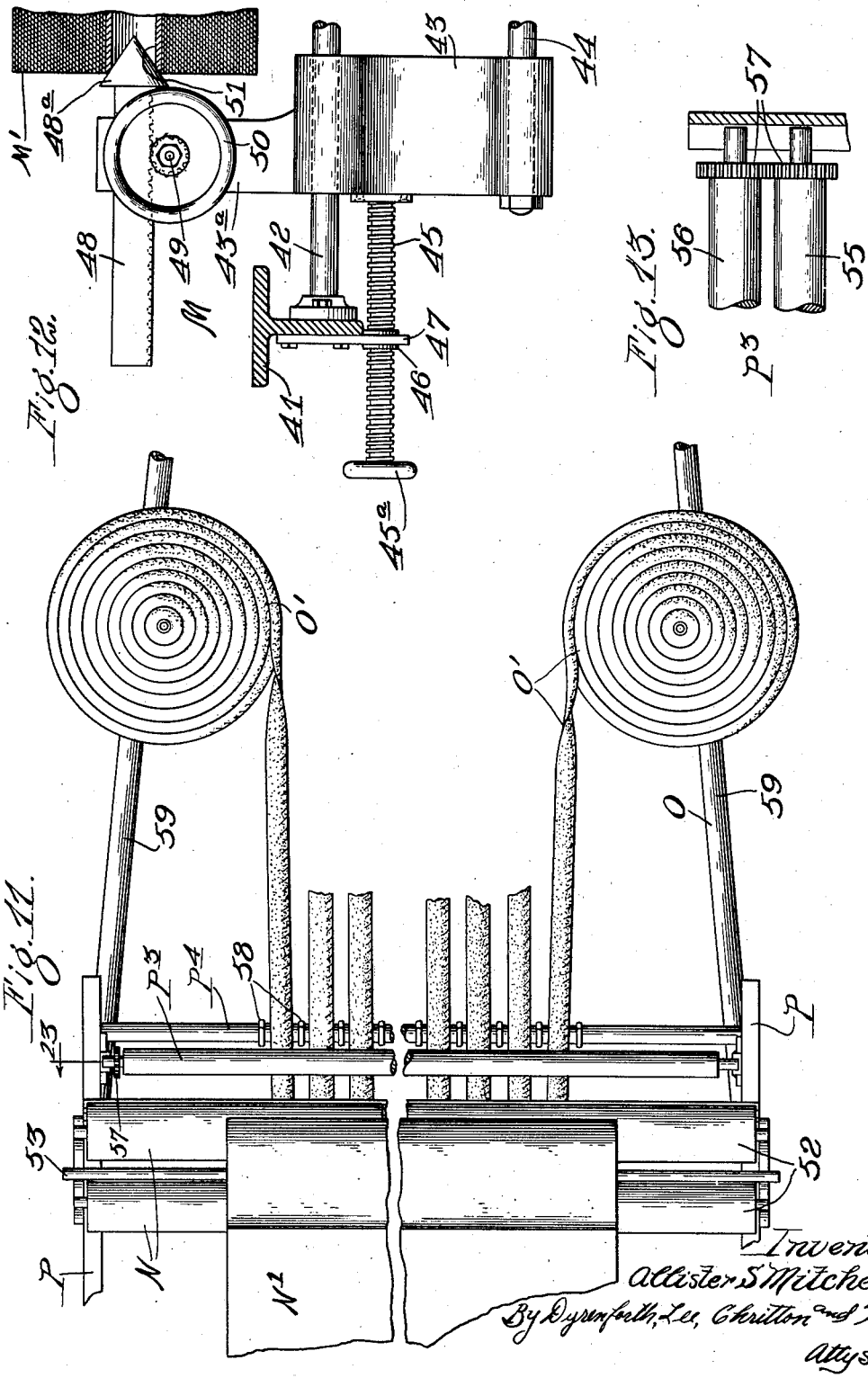

Aug. 21, 1934.   A. S. MITCHELL   1,971,115
UPHOLSTERY MAKING MACHINE AND PROCESS
Filed Feb. 10, 1930   8 Sheets-Sheet 7
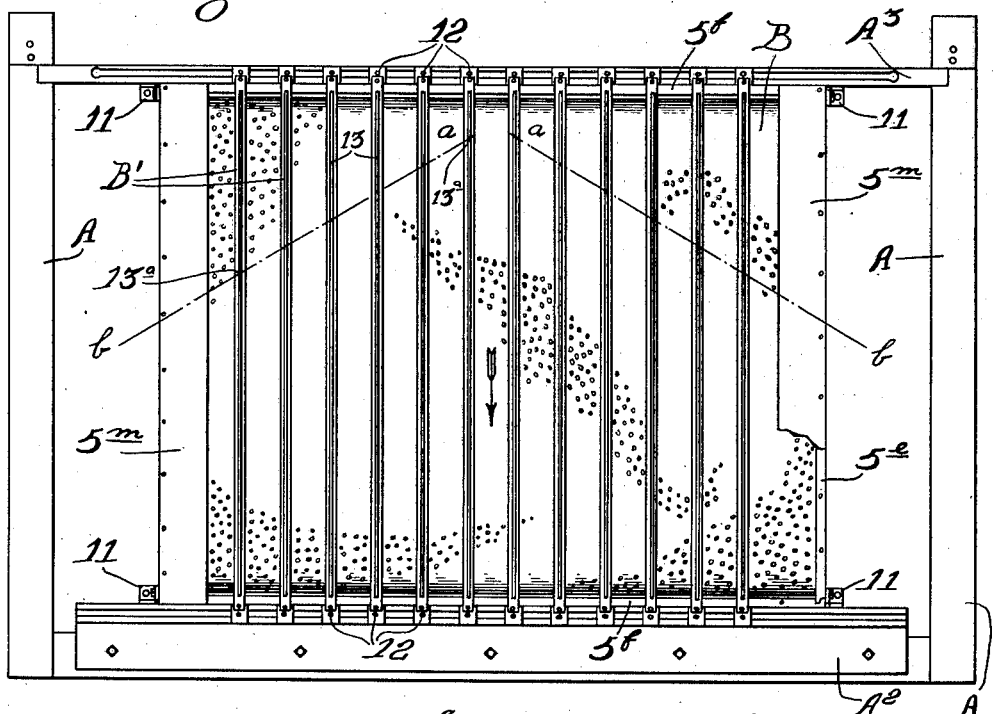
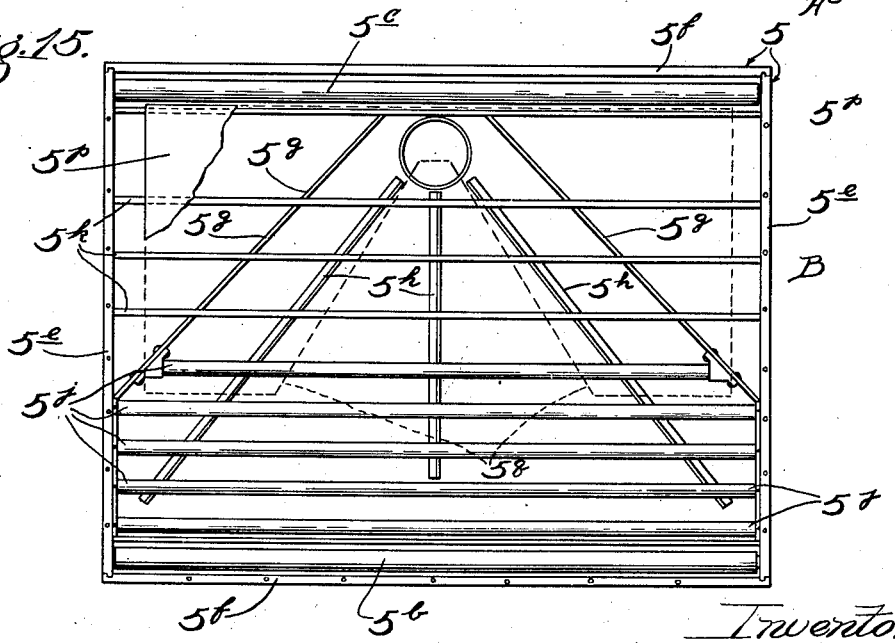

Aug. 21, 1934.  A. S. MITCHELL  1,971,115
UPHOLSTERY MAKING MACHINE AND PROCESS
Filed Feb. 10, 1930   8 Sheets-Sheet 8
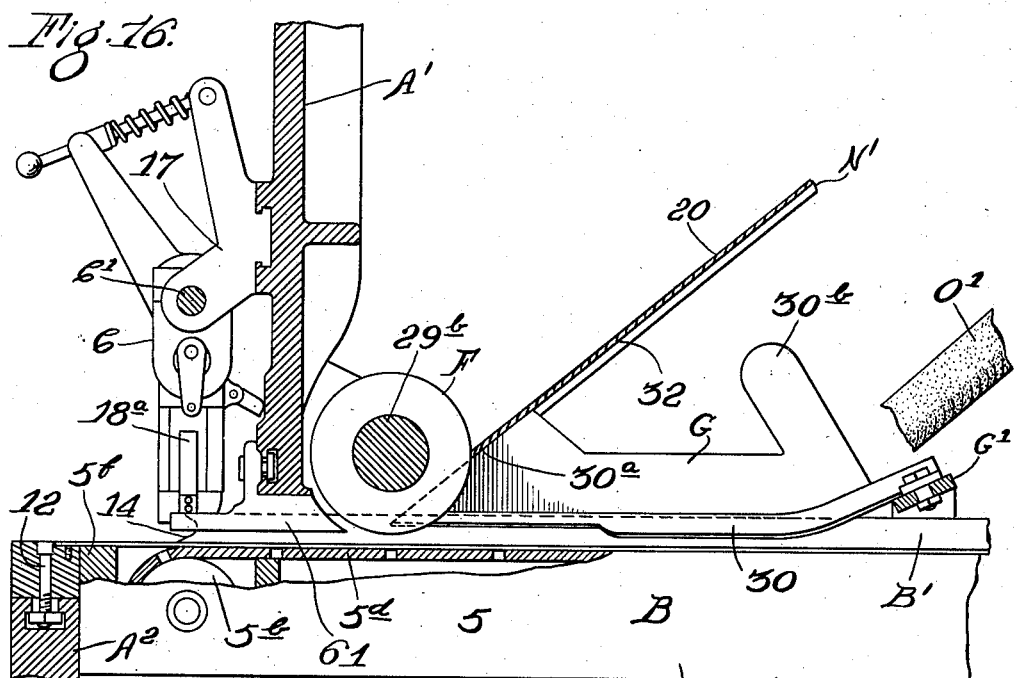
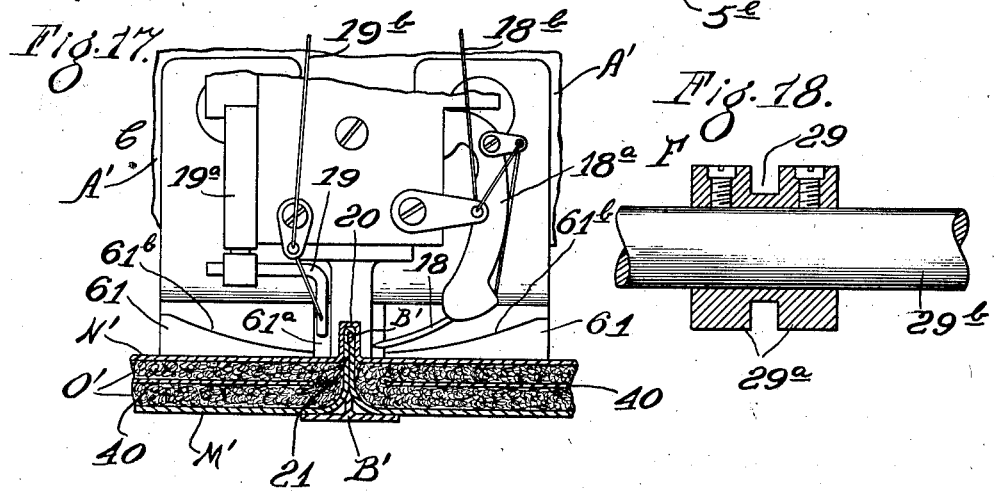
Inventor.
Allister S. Mitchell.
By Dyrenforth, Lee, Chritton and Wiles
Attys.

Patented Aug. 21, 1934

1,971,115

UNITED STATES PATENT OFFICE 1,971,115

UPHOLSTERY-MAKING MACHINE AND PROCESS

Allister S. Mitchell, Oakland, Calif., assignor to National Automotive Fibres, Inc., Detroit, Mich., a corporation of Delaware Application February 10, 1930, Serial No. 427,205

47 Claims. (Cl. 112—2)

This invention relates particularly to a machine and method for manufacturing stuffed, pleated upholstery. Such a machine is adapted, for example, to the manufacture of automobile seat-cushions, back cushions, etc.

The primary object is to provide an improved machine and improved method which will greatly facilitate the manufacture of stuffed, pleated upholstery.

The invention provides a machine and method whereby the upholstery-forming materials may be more easily fed through the machine, and whereby deeply stuffed pleats may be readily produced, if desired.

The objects of the invention are, in a large measure, accomplished by making use of the principle of fluid pressure (through the medium of a suction-carrier) for shaping the main (finish) fabric into pleat-fullnesses and intervening seam-ridges; and, preferably, important novel adjuncts are used in connection with the pneumatic carrier for feeding the materials through the machine and properly forming the upholstery.

In the use of the improved machine, as preferably constructed, a cover-fabric, a lining-fabric, and strips of batting are fed through the machine, the cover-fabric being the lower fabric in the upholstery-forming operation; the lining-fabric has formed therein upstanding seam-ridges; the cover-fabric has formed therein upstanding seam-ridges and intervening depressed pleats, or pipes, the seam-ridges of the cover-fabric becoming nested within the seam-ridges of the lining-fabric; the strips of cotton batting, or the like, are drawn through with the fabrics and fill the pipes; and the upstanding, nested seam-ridges of the lining-fabric and cover-fabric are sewed by means of sewing mechanisms mounted on a cross-beam above the path of the materials, each sewing mechanism preferably comprising a head carrying a sewing-needle and a looper-needle.

The work is fed continuously through the machine. The lining is a continuous fabric; the cotton batts are continuous strips; and the cover-fabric may be either a continuous fabric or pre-cut covers. In either case, a continuous piece of pleated upholstery may be produced which may be cut into suitable lengths for use in upholstering seats, backs, or the like.

Provision is made for breaking or severing the batting strips at suitable intervals corresponding with the spaces between cushions. That is, the feed of the batting strips is periodically arrested and the strips broken or severed, so that the strips will not extend across the spaces between cushions.

Describing briefly a preferred construction, the sewing mechanisms and certain other mechanisms which are disposed above the path of the work preferably are mounted on a vertically adjustable cross-head. This cross-head is equipped with forming devices, preferably a forming-roll, provided with circumferential grooves adapted to accommodate the seam-ridges of the fabrics; and the bed of the machine is equipped with an endless suction conveyor upon which the cover-fabric is carried through the machine over longitudinally disposed stationary ridge-bars which are interposed between the fabric and conveyor. The ridge-bars extend through the grooves of the forming-roll and the seam-ridges of the two fabrics are brought into nested relation as they pass over the ridge-bars through the grooves of the forming-roll. A series of lining-creasing members are adjustably mounted on the frame of the bed and extend somewhat into the grooves of the forming-roll above the ridge-bars. The batts, or strips of wadding material, are drawn from rolls supported on a rack at the rear of the machine, the strips being supported and carried by an endless conveyor to the feed rolls which deliver the strips to the pleat-fullnesses of the lowermost fabric before the fabrics and the batts pass between the forming-roll and the pneumatic conveyor. The ridge-bars have their initially-engaged (rear) ends provided with bevels of different lengths. The high points of the ridges of the intermediate bars engage the cover-fabric first, and high points of the ridges of the flanking ridge-bars are engaged in succession. This arrangement permits the proper gathering of the cover-fabric and the formation of the seam-ridges in succession from the central portion of the fabric toward the lateral edges thereof.

The invention is illustrated in a preferred embodiment in the accompanying drawings, in which—

Fig. 1 is a broken side elevational view of an upholstery-making machine embodying the invention; Fig. 2, a broken side elevational view showing a continuation of the machine; Fig. 3, a broken perspective view of the suction conveyor and associated ridge-bars; Fig. 4, a fragmentary sectional view taken as indicated at line 4 of Fig. 9 illustrating a batt-shearing device; Fig. 4ª a fragmentary view of a substitute shearing device adapted to a different width of pleat;

Fig. 5, a broken vertical longitudinal sectional view taken as indicated at line 5 of Fig. 9; Fig. 5ª, a broken plan view (partly in section) of batt-compressing devices; Fig. 5ᵇ, a similar view showing two associated pairs of such devices; Fig. 5ᶜ, a broken sectional view showing the pneumatic conveyor adjusting means employed; Fig. 6, a broken transverse vertical sectional view taken as illustrated at line 6 of Fig. 5; Fig. 7, a broken vertical sectional view illustrating a modified forming device (substitute for forming-roll); Fig. 7ª, a front view of the forming device shown in Fig. 7; Fig. 8, a broken front elevational view of the machine; Fig. 9, a broken plan view of the machine; Fig. 10, a broken sectional view taken as indicated at line 10 of Fig. 9, illustrating one of the adjustable dividers between the batts; Fig. 11, a broken plan view illustrating the manner in which the batts are drawn to the batt-conveyor; Fig. 12, a broken sectional view taken as indicated at line 12 of Fig. 9, illustrating the manner in which the roll of main fabric is supported; Fig. 13, a broken vertical sectional view taken as indicated at line 13 of Fig. 11; Fig. 14, a plan view of the pneumatic conveyor; Fig. 15, a plan view of the pan or frame, in which the pneumatic conveyor is mounted; Fig. 16, an enlarged broken vertical sectional view corresponding with Fig. 5; Fig. 17, a broken front view of one of the sewing mechanisms, the upholstery being shown in section; and Fig. 18, a detailed view showing the manner in which the circumferential grooves of the forming-roll are provided.

Describing the preferred embodiment illustrated:

A designates the main frame of the machine which is equipped near its front end with a vertically adjustable cross-head A', the frame being provided as shown in Fig. 5, with cross-members A² and A³; B, a suction-conveyor device mounted in the bed of the machine and adjustably supported on the cross-members A² and A³, said conveyor having associated therewith stationary ridge-bars B' which serve to produce seam-ridges in the main fabric; C, a series of sewing mechanisms mounted on the cross-head A' and laterally adjustable thereon to enable the width of pleats to be varied, the sewing mechanisms being actuated by a common shaft C', which as shown in Fig. 8, is driven through the medium of a coupling shaft C² from a shaft C³ journalled in the main frame; D, a thread-supporting device carried by the cross-head A'; E, E' a pair of front feed rolls through which the upholstery is delivered from the machine, these rolls being actuated through the medium of change-speed gear mechanism E²; F, a forming-roll disposed back of and carried by the lower portion of the adjustable cross-head A', said forming-roll having spaced circumferential grooves through which the ridge-bars B' extend; G, a series of lining-creasers adjustably mounted on a transverse bar G' carried by the bed; H, H' a main pair of batt-feeding rolls journalled in supports A⁴ carried by the bed; I, I', an auxiliary pair of batt-feeding rolls journalled in the members A⁴, these auxiliary rolls being periodically arrested to cause severance of the batts; J, a shearing device upon which the batts are severed when the rolls I and I' are stopped; K, a deflector roll whose function is to direct the batts between the rolls H and H' when the feed of the auxiliary rolls is resumed; L (Figs. 1 and 9), an electric motor which actuates, through the medium of a chain or belt L', gear mechanism L² of well-known construction; L³, a chain driven from the gear mechanism L² and serving to actuate a shaft L⁴ which forms a part of the gear mechanism E²; L⁵, a chain connecting the shaft L⁴ to a short parallel shaft L⁶, which, as shown in Fig. 9, serves to actuate the shaft-section C³, through the medium of which the shaft C' is driven to actuate the sewing mechanisms; L⁷ (Fig. 9) a chain driven from the lower feed roll E, and serving to actuate a shaft L⁸ which actuates a chain L⁹ which operates the auxiliary batt-feeding rolls and the batt conveyor; L¹⁰, a chain driven by the shaft L⁸ which serves to actuate a cam shaft L¹¹ equipped with a cam L¹² which controls a clutch-lever L¹³ which periodically operates a clutch L¹⁴ which controls the driving of the chain L⁹ from the shaft L⁸; L¹⁵ (Figs. 8 and 9) a chain driven from the front feed-roll E and serving to actuate a shaft L¹⁶ which, in turn, drives a chain L¹⁷ which actuates the suction-conveyor; L¹⁸, a chain driven from the roll E and serving to drive a shaft L¹⁹ from which motion is communicated through a gear device L²⁰ to the forming-roll F; L²¹, a chain driven by the shaft L¹⁹ and serving to actuate the main batt-feeding rolls H and H'; L²², a chain serving to drive the deflector shaft K from the auxiliary batt-feeding roll I'; M, supporting means for the main or finish fabric mounted on the main frame and carrying a roll of cloth M', from which a supply is led over the suction-conveyor B, to ride on the ridge-bars B'; N (Fig. 2) supporting means for a roll of lining fabric N', the lining fabric being led forwardly in the manner shown in Fig. 1. O (Fig. 2), supporting means for rolls of cotton batting O', the strips of batting being led forwardly over a conveyor; P, a conveyor frame having its front portion supported on standards P' mounted on the bed of the machine; P² an endless conveyor which carries the batts to the auxiliary feed rolls I and I', P³ (Figs. 2, 11 and 13) a pair of feed rolls located at the rear portion of the batt conveyor and disposed in front of a shaft P⁴ over which the batts are drawn to a conveyor; and P⁵ (Figs. 1, 9 and 10) laterally adjustable divider-strips disposed over the top length of the conveyor P² and carried by transverse bars P⁶ mounted on the frame P.

The main frame A of the machine may be of any suitable construction. At the rear end of the bed of the machine there is journalled a double-taper roll 1 (Figs. 1 and 9) which is of largest diameter at its center and tapers to its ends. This roll serves to aid in working the main fabric M' somewhat toward the center, so that it will more readily provide pleat-fullnesses which are formed when the fabric passes over the longitudinal ridge-bars disposed above the suction-conveyor. The fabric passes from the roll M' to a roller 2, and then over the double-taper roll 1, and then over the ridge-bars and conveyor.

The main frame is shown equipped some distance back of the roll M' with another tapered roller 3 about which the cloth passes on its way to the roll 1. The roller 3 has the same function as the roll 1. In passing from the roll M' to the roller 3, the cloth passes over a splicing plate 4, which is equipped at one end with pins 4ª adapted to hold one end of an adhesive tape which may be used for splicing the end of a new roll of cloth to the final end of the used cloth, so that a fresh supply of cloth may be led through the machine.

The suction conveyor B (Figs. 3, 5, 14 and 15) comprises a hollow rectangular frame 5, which is open at its top and which is equipped with a bottom wall $5^a$ having near its rear end a perforation with which is connected an exhaust pipe 6; front and rear rollers $5^b$ and $5^c$ journalled in the frame, and an endless foraminous belt $5^d$ which passes about the rollers $5^b$ and $5^c$. The sidewalls of the pan are designated $5^e$. They are connected by transverse bars $5^f$ to which the front and rear margins of the bottom wall $5^a$ are connected. The lower length of the belt passes over a roller 7 and then about a roller 8 journalled in a bracket 9 which depends from the frame 5. The belt is driven through the medium of the roller or pulley 7, which is equipped with a projecting shaft $7^a$ upon which is secured a sprocket wheel actuated by the sprocket chain $L^{17}$. The sprocket chain passes about idlers on shaft $8^a$ of the drum 8 and the shaft 10 of the rear roll $5^c$.

In the rear portion of the pan are disposed oblique walls $5^g$ which are approximately the height of the pan; and baffles $5^h$ of lower height rise from the bottom of the pan. These members are intended to direct the air currents. It may be stated here that the air is first applied to the central portion of the cloth as it passes across the pan, and that the zone of the application of the air widens as the cloth advances to the front of the pan.

The conveyor belt may be of any suitable material. It may be a rubber belt provided throughout its area with small perforations, as shown. The pan 5 is shown equipped internally with rollers $5^j$ which support the front portion of the upper length of the belt. The sides of the pan are connected also by shafts or bars $5^k$ which extend freely through notches $5^l$ in the members $5^g$. The edges of the belt contact with the side walls of the pan; and, as shown in Fig. 14, the side walls $5^b$ of the pan have their upper edges equipped with flexible sealing strips $5^m$ which lap upon the margins of the upper length of the belt. These strips may be of very thin flexible sheet metal.

The pan is adjustably supported between the cross-members $A^2$ and $A^3$ by means of four adjusting devices 11. A detail is shown in Fig. $5^c$. The frame 5 is equipped with clips $11^a$ which are connected by right and left threaded adjustment screws $11^b$ with clips $11^c$ secured to the cross-members of the main frame. The suction conveyor may be raised or lowered with reference to the ridge-bars B' to enable a pleat of the desired depth to be formed.

The ridge-bars B' have their ends connected with the cross-bars $A^2$ and $A^3$ by means of bolts 12 adjustably connected with T-slots with which the upper edge portions of the cross-members are provided. This enables the bars to be adjusted to correspond with the width of the pleats.

As will be understood from Figs. 3 and 14, the rear ends of the ridge-bars are beveled or sloped so that the initial high points of the ridges are along the oblique dotted lines a—b shown in Fig. 14. The bevels are designated 13 and the initial high points of the ridges which are engaged by the cloth as it moves forwardly are indicated at the points $13^a$. In the illustration shown in Fig. 14, provision is made for an even number of seams. Accordingly, the two intermediate ridges are connected first by the cloth; then the two flanking adjacent ridges, and so on, in sequence, to the edge portions of the cloth. Thus, it appears that the initially engaged ends of the ridges are arranged in such manner that the intermediate portion of the cloth is formed into pleat-fullnesses before the marginal portions of the cloth are so formed. The arrangement permits the cloth to gather freely and form the two intermediate seam-ridges; then the next two flanking seam-ridges; and so on, in sequence.

The manner in which the ridge-bars extend through the grooves of the forming-roll F and through corresponding grooves at the lower edge of the cross-beam A' will be understood from Fig. 16. The ridges are recessed or cut away, as indicated at 14, to permit the sewing-needle to operate through the seam-ridges of the fabrics.

The suction pipe 6 connects, as shown in Fig. 1, with the intake portion of a fan or blower 15. This blower is shown operated by an independent motor 16. Obviously, however, the blower may be operated in any suitable manner; or, if desired, the suction pipe 6 may connect with a suction line in a factory.

Supported on the upper edges of the members $5^g$ is a plate $5^p$ (Fig. 15) which is provided with a large V-shape notch disposed between the lines $5^q$. The suction is applied through this V-shape notch in a graduated way, first at the central portion, and then gradually increasing over a wider zone, corresponding in a general way with the gathering of the finish-fabric and shaping it over the ridge-bars B' and in the intervening spaces. Should it be desired to sew a cushion having an odd number of seams, the central ridge-bar would perform the first gathering and shaping and the flanking ridge-bars would be engaged in succession. The large notched plate $5^p$ is capable of being shifted in either direction for the purpose of centering the plate with respect to the ridge-bar or ridge-bars first engaged in the forming action by the finish-fabric.

The sewing mechanisms C may be of any suitable construction and operated in any suitable manner. The sewing mechanisms shown are the same as those shown in Mitchell United States application, Serial No. 347,935, filed March 18, 1929, and need not be described in detail. Referring to Figs. 16 and 17, it may be stated, however, that the sewing mechanisms are pivotally suspended from brackets 17 which are adjustably mounted on the cross-head A' and that the actuating shaft C' is also journalled in said brackets. The sewing-needle is designated 18. It is actuated by a lever $18^a$ which swings in a transverse plane. The sewing thread is designated $18^b$.

The looper-needle is designated 19. It is actuated by a lever $19^a$ which swings in a plane parallel with the seam and also raises and lowers, so that the point portion of the looper-needle is carried in an elliptical path, the sewing-needle passing first above and then below the looper-needle. The looper-needle thread is designated $19^b$.

As the fabrics move through the machine, the lining fabric N' has formed therein U-shape seam-ridges 20, and the main fabric M' has formed therein U-shape seam-ridges 21 which become nested within the seam-ridges 20. In the sewing operation, the sewing-needle passes through the nested seam-ridges; and the sewing-needle and looper-needle co-operate to produce a double thread chain stitch, which is familiarly known in the trade as a lock-stitch.

The spool-support D carried by the vertically adjustable cross-head A' supports the looper thread spools 22 and the sewing thread spools 23.

The front feed rolls E and E' are connected by gears 24 (Figs. 1, 5 and 8). The upper feed roll is journaled in brackets 25 carried by a shaft 26 journaled in lugs 27. Springs (not shown) may be employed to hold the roll E' yieldingly against the roll E. When desired, the roll E' may be thrown forwardly to the position shown in Fig. 1 to enable the cushion materials to be introduced. The rolls preferably are covered with rubber, as indicated at 28.

Referring to Figs. 5, 6, 16 and 18, it will be noted that the forming-roll F is provided with circumferential grooves 29. These grooves may be formed in adjustable collars 29ª mounted on a shaft 29ᵇ. The collars may be adjusted to space the grooves according to the width of pleat desired.

It will be noted that the lining-creasers G are disposed over the ridge-bars B'. These members are provided with Y-shape base portions 30 which project on opposite sides of the ridge bars and serve to properly guide the batts as they approach the forming-roll. The lining-creasers are provided also with beveled front edges 30ª which extend into the grooves 29 of the forming-roll. The lining N' passes to the forming-roll from a roller 31 mounted at the front end of the frame P. This roller is provided with spaced flanges or collars 31ª (Fig. 9) which serve to produce rudimentary seam-ridges 20 in the lining fabric. These fullnesses, or shallow seam-ridges, persist in the fabric more or less until the lining-creasers, or shoes, G are engaged, and at this point the seam-ridges 20 ride over the bevels 30ª of these thin shoes and are guided into the grooves of the forming-roll in such manner as to be in position to receive the seam-ridges of the finish-fabric M'. The shoes or lining-creasers G are shown equipped with rigid handle portions 30ᵇ for convenience in handling and adjusting the members.

The rolls H and H' preferably are fluted longitudinally. The same is true of the rolls I and I'. The upper rolls of each set preferably are yieldingly held by springs 33.

The main batt-feeding rolls H and H' are driven continuously. The auxiliary batt-feeding rolls I and I' are periodically arrested to cause the batts to be severed between cushions.

The drive chain L⁹ is intermittently stopped, so as to stop the operation of the auxiliary batt-feeding rolls I and I' and also the operation of the batt-conveyor P². The chain L⁹ drives a gear 34 which operates a gear 35 which, in turn, operates the feed roll I and a roll 36. The latter actuates the batt-conveyor P².

The front portion of the batt-conveyor is inclined downwardly and forwardly and the divider strips P⁵ are likewise provided with downwardly and forwardly inclined extensions 37. As shown in Figs. 5ª and 5ᵇ, the lower ends of the extensions 37 of the divider bars are equipped with pairs of pivotally supported compression-members 37ª. These members have the adjustable compressor fingers 37ᵇ supported on pivots 37ᶜ and adapted to be spread apart or extended by means of a cam device 37ᵈ which can be fixed in any desired position by means of an adjusting stem 37ᵉ (Fig. 5). The dividers are supported at this point by a cross-bar 38 carried by lugs on the uprights P'.

The batt-severing bar J (Figs. 4 and 5) is removably attached to the frame members A⁴. It is provided with an edge 39 over which the batts pass, this edge being provided with shearing notches 39ª. Referring to Figs. 6 and 17, the batts usually are provided internally with reinforcing paper strips 40, and it is the function of the shearing edge to tear the paper when the auxiliary feed-rolls I and I' are stopped. When the rotation of the rolls I and I' is resumed, the deflector roll K operates to guide the batts to the main batt-feeding rolls H and H'. The driving mechanism, consisting of the motor L and the various drive chains and so forth, has already been described.

The means M for supporting the main fabric roll will be understood from Fig. 12. Members 41 of an extension of the main frame are rigidly connected by a cross shaft 42 upon which are mounted slides 43 which are connected by cross rods 44. The slides 43 have swivel connections with the inner ends of adjusting screws 45 which extend through nuts 46 carried by lugs 47 which depend from the frame members 41. The screws 45 are equipped with hand-wheels 45ª.

The slides 43 are equipped with upward extensions 43ª in which are slidably mounted rack-equipped shafts 48 operated by pinion-equipped shafts 49 provided with fixedly secured hand-wheels 50. The inner ends of the members 48 are cones 48ª which engage in the end portions of pasteboard tubes 51 upon which the roll of cloth M' is supported. The desired frictional resistance to the turning of the roll is inserted at the cone 48ª. When it is desired to introduce a fresh roll of cloth, this may readily be done by retracting the member 48.

The device N for supporting the roll of lining-fabric N' (Figs. 2 and 11) is shown as comprising a pair of rollers 52 journalled in the rear end of the frame P. The roller is shown provided with a projecting core 53 which bears against the upright 54. The means P³ which draws the batts to the conveyor consists of a lower roller 55 and an upper roller 56, these rollers being connected by gears 57. The lower roller is driven by the conveyor belt P².

The shaft P⁴ is equipped with guide collars 58.

The rack O which supports the rolls of batts O' may be of any suitable construction. It is shown as comprising shafts or bars 59 whose front ends are secured to standards 60 which serve to support the rear end of the frame P. The rear ends of the members 59 may be supported in any suitable manner (not shown).

Referring again to Figs. 16 and 17, the lower portion of the cross-head A' is equipped with laterally adjustable shoes 61 which afford between them a groove or space 61ª which is in alinement with the groove in the forming-roll F. The shoes are suitably recessed on their upper sides, as indicated at 61ᵇ, to permit the needles to operate.

The operation of the machine may be described briefly:

Assuming a slight or moderate vacuum to be maintained in the suction conveyor, this conveyor operates to feed the cover-fabric through the machine and form it into seam-portions and intervening pleat-fullnesses. The cover-fabric, designated M', is drawn from the roll supported by the holders M (Fig. 1) and passes over the double-taper rolls 3 and 1, and then over the ridge-bars B', the fabric being properly gathered and shaped over the ridge-bars by the suction exerted through the perforate conveyor 5ᵈ. The batts are carried by the batt-conveyor P² to the auxiliary batt-feeding rolls I and I', from which the batts pass over the shearing bar J and thence through the main batt-feeding rolls H and H'. The lining-fabric N' is drawn from the roll supported on the rear portion of the frame P, and passes over the roll 31 which is provided with spaced collars 31ᵃ, which collars may be adjusted to correspond with the spaces between the seam-ridges. The lining-fabric has the seam-ridges 20 preparatorily formed therein in passing over the flanged roll. These seam-ridges persist more or less until they encounter the creasers G which direct them properly into the grooves of the forming-roll F. In passing between the forming-roll and the pneumatic conveyor, the seam-ridges of the two fabrics become properly nested and the batts become properly entered in the pleats as they are formed. The seams pass through the base portions of the sewing mechanisms which operate to sew the nested seam-ridges together. The upholstery then passes on through the front feed rolls E and E', which preferably are geared to operate slightly faster than the other feed devices.

By employing the method of shaping the main fabric upon a ridged bed, employing pneumatic pressure, (caused by suction) to shape the fabric over the ridges with which the bed is equipped, it is possible to avoid the use of upper formers disposed over the ridges for effecting the shaping of the finish-fabric. Thus, it is possible to eliminate friction and leave the space open back of the forming-roll, so that access can be readily had at this point.

In forming automobile cushions, it is quite common to use heavy expensive fabrics which have the nap turned downwardly in a machine of the character here described; and sometimes the upper side of the fabric is rubberized. It has been found extremely difficult in machines previously devised by me to feed a fabric of the character mentioned without injuring the fabric or without causing difficulties in the operation of the machine. The present invention overcomes such difficulties and, moreover, enables any desired weight of batts to be employed in making the cushion, it being understood that the pneumatic conveyor can be lowered to increase the pleat-fullnesses, at will.

The feature of carrying the batts on an endless conveyor to the point where they are gripped by the feed rolls is an important feature, since it insures greater perfection in the operation of the machine and tends to avoid breakage of the batts.

The interruption of the operation of the auxiliary feed rolls I and I' is accomplished by means of the cam-lever L¹³ and the clutch L¹⁴ described in a previous application Serial No. 347,935, filed March 18, 1929. However, the batt-carrying conveyor P² is, according to the present invention, geared to the auxiliary feed rolls I and I', so that these devices cease operating at the same instant when the batts are to be severed; and they resume operation at the same instant after the severance of the batt. The interval between stoppages of the auxiliary feed rolls I and I' may be varied as described in said previous application; also, the period of stoppage may be varied by varying the width of the cam L¹².

In the modification shown in Figs. 7 and 7ᵃ, F'' designates a forming device which takes the place of the forming-roll F previously described. In this modification, shoes 62 takes the place of the shoes 61 previously described and these shoes 62 are provided with curved extensions 62ᵃ which are separated by a space 63. The seam-ridges of the fabrics are directed through the spaces 63 by means of the ridge-bars B' and lining-creasing shoes G in the manner described with reference to the forming-roll F. It is preferred, however, to use a rotating forming-roll, which facilitates the passage of the materials through the machine at this constricted point.

Referring again to Fig. 4ᵃ, J' designates a severing bar having notches 63 which are more widely separated from each other than are the notches 39ᵃ. The bar J' may be substituted for the bar J. Any desired number of substitute bars may be provided so that the proper bar may be selected, depending upon the width of the pleat.

Broadly, the relation of the pneumatic carrier and the ridges disposed over it is such that the mechanism is adapted to carry to the sewing mechanisms a fabric having raised seam-portions and intervening depressed pleat fullnesses. No unnecessary limitation is to be understood from the specific illustration given.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In upholstery manufacture: pneumatically gathering a fabric and forming seam-portions and intervening pleat-fullnesses over and between ridges, such gathering commencing at an intermediate portion of the fabric and progressing laterally, in sequence, towards both lateral margins of the fabric.

2. In an upholstery-making machine: a main frame; a cross-head carried thereby and equipped at its lower portion with forming devices; a series of sewing mechanisms mounted on said cross-head in front of said forming devices; a suction conveyor and associated spaced ridges above said conveyor adapted to carry a fabric and serve in forming it into pleat-fullnesses and intervening seam-portions while the seam-portions being formed are subjected to suction; means for feeding another fabric beneath the forming devices carried by said cross-head; and means for delivering batts between the fabrics into said pleat-fullnesses.

3. A machine as specified in claim 2, provided with creasing devices co-operating with the forming devices carried by said cross-head and serving to form seam-portions in the second-mentioned fabric.

4. A machine as specified in claim 2, characterized by creasing devices disposed over said ridges and co-operating with the forming devices carried by said cross-head in the forming of seam-portions in the second-mentioned fabric.

5. A machine as specified in claim 2, characterized by creasing devices disposed over said ridges and co-operating with the forming devices carried by said cross-head in the forming of seam-portions in the second-mentioned fabric, and characterized further by a roller provided with spaced collars over which the second-mentioned fabric passes on its way to said creasing devices.

6. In an upholstery-making machine: a main frame provided with a bed; longitudinal ridge-bars mounted on said bed; and a suction conveyor mounted in said bed beneath said ridge-bars and adapted to subject fabric to suction as it is carried by the conveyor along said ridge-bars.

7. A machine as specified in claim 6, in which the suction conveyor is adjustable with relation to the ridge bars to enable the pleat-fullnesses to be varied.

8. A machine as specified in claim 6, equipped with a cross-head above the front portion of said bed carrying forming devices affording spaced grooves, the ridge-bars extending through said grooves.

9. A machine as specified in claim 6, equipped with a cross-head above the front portion of said bed carrying forming devices affording spaced grooves, the ridge-bars extending through said grooves; and sewing mechanisms disposed in front of and carried by said cross-head.

10. A machine as specified in claim 6, equipped with a cross-head above the front portion of said bed carrying forming devices affording spaced grooves, the ridge-bars extending through said grooves; sewing mechanisms disposed in front of and carried by said cross-head; and upholstery-pulling rolls disposed in front of said sewing mechanisms.

11. In an upholstery-making machine: a main frame provided with a bed; a cross-head carried thereby equipped at its lower portion with spaced forming shoes and back of said shoes with a forming-roll having grooves corresponding with the spaces between said shoes; a pneumatic carrier mounted in said bed; stationary ridge-bars mounted in said bed above said carrier; and a series of fabric-creasers located over said ridge-bars and projecting into the grooves of said forming-roll.

12. In an upholstery machine; a frame provided with a bed; a cross-head extending across the front portion of said bed and equipped with forming devices provided with grooves for the passage of seam-ridges; a series of sewing mechanisms mounted on said cross-head; a series of ridge-bars mounted on said bed and extending through said grooves; a suction conveyor disposed beneath said ridge-bars; a series of fabric-creasing devices disposed over said ridge-bars and having divergent flanges housing the upper portions of the ridge-bars; means for delivering a fabric to said suction conveyor; means for delivering a fabric over said creasing-devices; and means for delivering batts to the spaces between said creasing devices.

13. In an upholstery machine: a main frame provided with a bed; a series of ridge-bars mounted on said bed; and a pneumatic carrier disposed beneath and co-acting with said ridge-bars to form fabric into pleat-fullnesses between said ridge-bars while it is subjected to suction, said carrier comprising a suction pan and a foraminous belt having its upper length forming a cover for said pan.

14. A machine as specified in claim 13, characterized by the initially engaged high points of the ridges being arranged to engage the fabric first at the central portion and then progressively from the central portion towards the lateral edges, and characterized further by an adjustable baffle plate associated with the upper length of the conveyor.

15. In an upholstery machine; means for feeding fabrics and providing seam-portions and intervening pleat-fullnesses; mechanisms for sewing the fabrics together at said seam-portions; main batt-feeding devices adapted to feed batts between the fabrics; additional batt-feeding devices, including a conveyor; means for continuously operating the main batt-feeding devices; means for operating said additional batt-feeding devices; and means for periodically arresting the operation of said additional batt-feeding devices to cause severance of the batts.

16. A machine as specified in claim 15, in which said additional batt-feeding devices include auxiliary batt-feeding rolls which grip the batts at a point in front of said conveyor.

17. A machine as specified in claim 15, characterized by a shearing bar interposed between said main batt-feeding devices and said additional batt-feeding devices.

18. A machine as specified in claim 15, characterized by a shearing bar interposed between said main batt-feeding devices and said additional batt-feeding devices, and characterized further by a deflector roll disposed in front of said shearing bar.

19. In an upholstery machine: means for feeding fabrics and forming seam-portions and intervening pleat-fullnesses; sewing mechanisms for sewing the seam portions; and batt-feeding means, including an endless batt-conveyor and spaced dividers disposed adjacent the upper length of said conveyor.

20. A machine as specified in claim 19, characterized by batt-compressors disposed at the front ends of said dividers and adapted to apply lateral compression to the batts.

21. A machine as specified in claim 19, characterized by a pair of batt-feeding rolls located in front of the endless conveyor, a second pair of batt-feeding rolls interposed between said first-mentioned rolls and the front end of the conveyor, means between said pairs of rolls for effecting severance of the batts periodically, and batt-compressing devices associated with the front ends of said dividers and disposed back of said second pair of batt-feeding rolls.

22. In an upholstery machine: means for feeding fabrics, providing pleat-fullnesses and intervening seam-portions, and sewing the seam-portions together; and means for delivering batts between the fabrics into the pleat-fullnesses, comprising an endless batt-conveyor, a pair of batt-pulling rolls near the rear end of said conveyor, and means for supporting rolls of batts back of said batt-pulling rolls.

23. In an upholstery machine, fabric feeding and creasing means comprising a roller equipped with spaced collars, a series of creasers extending in substantially straight lines and located a substantial distance from said roller and engaging the creases preformed by said collars, and sewing devices receiving said fabric from said creasers.

24. In an upholstery-making machine: a pneumatic carrier and associated ridges over which a fabric may be formed and advanced, said fabric being subjected to the pneumatic action of the carrier as it passes through said ridges; and sewing-mechanisms disposed above the front portion of the carrier, said ridges extending beneath said sewing mechanisms.

25. In an upholstery-making machine: a pneumatic carrier; and laterally adjustable ridge-bars disposed over said carrier.

26. In an upholstery-making machine: a pneumatic carrier; and associated spaced stationary ridges disposed over and extending wholly across the carrier longitudinally thereof.

27. In an upholstery-making machine: a pneumatic carrier and spaced ridges adjacent thereto, said ridges serving to support seam-portions of a fabric over said carrier and said carrier serving to grip pleat-fulnesses in said fabric between the lines of said ridges; means for bringing a second fabric to position adjacent the first-mentioned fabric; and means for sewing said fabrics together along the lines of said seam-portions.

28. A machine as specified in claim 27, combined with means for supplying strips of batting to said pleat-fulnesses as the fabrics advance to the sewing means.

29. A machine as specified in claim 27, in which the fabric-carrier comprises an endless suction-belt presenting a substantially flat upper surface, and in which said ridges are in the form of ridge-bars disposed adjacent said surface and extending longitudinally across the same.

30. A machine as specified in claim 27, in which the seam-ridges are in the form of laterally adjustable, continuous, fixed ridge-bars which extend longitudinally across and beyond said carrier, over which ridge-bars the seam-portions of said first-mentioned fabric may slide.

31. A machine as specified in claim 27, in which said ridges are in the form of fixed, continuous ridge-bars extending longitudinally across and projecting beyond the carrier, and in which said carrier may be adjusted with respect to said ridge-bars to vary the depth of the pleat-fullnesses.

32. A machine as specified in claim 27, in which the fabric-carrier comprises an endless suction-belt, and in which said ridges are in the form of continuous fixed ridge-bars spaced with relation to each other and extending longitudinally across the upper length of said suction-belt, the high points of the rear ends of said ridges being so arranged as to engage the fabric first at an intermediate portion thereof and then progressively outwardly towards the lateral edges of the fabric as the fabric is advanced by said suction-belt.

33. In an upholstery-making machine: a main frame provided with a bed comprising a suction-belt having a substantially flat upper length; ridge-bars extending longitudinally across said belt and disposed adjacent the upper surface thereof, said ridge-bars having tapered rear ends, the initially engaged high points of which are arranged in oblique lines which converge rearwardly; means for supplying a continuous fabric, said suction-belt being operative to advance said fabric and cause it to be gathered and formed into raised seam-portions and depressed pleat-fulnesses; means for bringing a second fabric into position over the formed portion of said first-mentioned fabric; and means for sewing said fabrics together along the lines of said seam-portions.

34. A machine as specified in claim 33, combined with means for supplying continuous batts to said pleat-fulnesses as said fabrics are advanced to the sewing means.

35. In an upholstery-making machine: a bed comprising a suction-belt having a substantially flat upper length; spaced ridge-bars extending longitudinally across said belt and disposed adjacent the upper length thereof, said suction-belt serving to feed forwardly a fabric overlying said ridge-bars and having pleat-fulnesses between the ridge-bars gripped by the suction-belt; a series of shoes overlying portions of said ridge-bars; means for delivering continuous batts to the spaces between said shoes; means for feeding a second fabric into position to overlie the first-mentioned fabric and the batts; and means for sewing said fabrics together along lines between the batts.

36. A machine as specified in claim 35, in which said ridge-bars extend to the sewing means and serve to support the fabrics while they are being sewed.

37. In an upholstery-making machine: a bed equipped with spaced, fixed rigid ridge-bars; a conveyor beneath said ridge-bars having pneumatic means acting through the spaces between the ridge-bars for gripping and advancing a fabric which is carried slidably over the ridge-bars; means for feeding a second fabric to position over the first fabric; and means for sewing said fabrics together along lines spaced to correspond with the spacing of the ridge-bars.

38. A machine as specified in claim 37, in combination with means for supplying continuous batts to pleats formed between said ridge-bars.

39. In an upholstery-making machine: a bed comprising a suction-belt having a substantially flat upper length and ridge-bars exending longitudinally across said belt, said belt serving to advance a fabric having seam-portions supported on said ridge-bars and intervening pleat-fulnesses gripped by the suction-belt; means disposed over said bed for feeding continuous batts into said pleat-fulnesses; driven forming-means disposed over said bed and having spaces through which seam-portions of fabrics may pass, through which spaces said ridge-bars extend; means for supplying a second fabric to the space between said driven forming-means and said bed; and sewing means serving to sew said fabrics together along the lines of said seam-portions.

40. In upholstery manufacture, the steps which comprise: pneumatically gripping and carrying a fabric so as to form seam-portions and intervening depressed pleat-fulnesses; bringing a second fabric to superposed relation with respect to the first-mentioned fabric; and sewing said fabrics together along the lines of said seam-portions.

41. In upholstery manufacture, the steps which comprise: pneumatically forming in a fabric pleat-fulnesses and raised seam-portions intervening between the pleat-fulnesses and gripping said pleat-fullnesses and advancing said fabric thus gripped; bringing a second fabric to position over the first-mentioned fabric and into engagement with the seam-portions thereof; and sewing the fabrics together along the lines of said seam-portions while advancing both fabrics.

42. In upholstery manufacture, the steps which comprise: pneumatically forming in a fabric pleat-fulnesses and raised seam-portions intervening between the pleat-fulnesses and gripping said pleat-fulnesses and advancing said fabric while thus gripped; feeding continuous strips of batting to the pleat-fulnesses; bringing a second fabric to position over the first-mentioned fabric and into engagement with the seam-portions thereof; and sewing the fabrics together along the lines of said seam-portions while advancing both fabrics.

43. In the manufacture of upholstery, the steps which comprise: supporting a fabric along parallel spaced lines and advancing the fabric while applying suction to depressed portions of the fabric intervening between said spaced lines; bringing a second fabric into position over the first-mentioned fabric; and sewing the fabrics together along lines corresponding with said parallel spaced lines as the fabrics are advanced, while said depressed portions of the first-mentioned fabric are suctionally gripped.

44. In the manufacture of upholstery, the steps which comprise: supporting a fabric along spaced lines; and suctionally drawing pleat-fulnesses into spaces between said lines and advancing the fabric.

45. In upholstery manufacture, the steps which comprise: pneumatically gripping pleat-fulnesses of a fabric having raised seam-portions intervening between the pleat-fulnesses and advancing said fabric thus gripped; bringing a second fabric into superposed position with respect to the first-mentioned fabric and into engagement with the seam-portions thereof; and sewing the fabrics together along the lines of said seam-portions while advancing both fabrics.

46. In upholstery manufacture, the steps which comprise: pneumatically gripping pleat-fulnesses of a fabric having raised seam-portions intervening between the pleat-fulnesses and advancing said fabric while thus held; feeding strips of batting into the pleat-fulnesses; bringing a second fabric into superposed position over the first-mentioned fabric and into engagement with the seam-portions thereof; and sewing the fabrics together along the lines of said seam-portions while advancing both fabrics.

47. In upholstery manufacture, the steps which comprise: advancing a fabric comprising seam-portions and intervening pleat-fulnesses while applying suction to the fabric in the form stated: feeding batts to the pleat-fulnesses of the advancing fabric; advancing a second fabric superposed over said batts and contacting said seam-portions; and sewing the fabrics together along the lines of said seam-portions while the fabrics are being advanced.

ALLISTER S. MITCHELL.